(12) United States Patent
Jamison et al.

(10) Patent No.: US 10,689,268 B1
(45) Date of Patent: Jun. 23, 2020

(54) COATED POROUS SUBSTRATES FOR OIL AND GAS OR CHEMICAL PROCESSING WASTEWATER TREATMENT

(71) Applicant: Halliburton Energy Services, Inc., Houston, TX (US)

(72) Inventors: Dale E. Jamison, Humble, TX (US); William Walter Shumway, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/599,314

(22) Filed: Oct. 11, 2019

(51) Int. Cl.
*C02F 1/28* (2006.01)
*C02F 1/44* (2006.01)
(Continued)

(52) U.S. Cl.
CPC .............. *C02F 1/288* (2013.01); *C02F 1/281* (2013.01); *C02F 1/44* (2013.01); *C02F 1/004* (2013.01); *C02F 1/24* (2013.01); *C02F 1/32* (2013.01); *C02F 1/38* (2013.01); *C02F 1/4696* (2013.01); *C02F 1/72* (2013.01); *C02F 3/342* (2013.01); *C02F 2101/32* (2013.01); *C02F 2103/001* (2013.01); *C02F 2103/10* (2013.01); *C02F 2103/36* (2013.01)

(58) Field of Classification Search
None
See application file for complete search history.

(56) References Cited

U.S. PATENT DOCUMENTS 4,872,991 A * 10/1989 Bartels ............... B01D 17/0208
 210/651
7,491,336 B2   2/2009 Markham et al.
(Continued)

FOREIGN PATENT DOCUMENTS

JP    2017159291 A    9/2017
KR    101837230 B1    3/2018
(Continued)

OTHER PUBLICATIONS

Filing receipt and specification for patent application entitled "Graphene Oxide Coated Membranes to Increase the Density of Water Base Fluids," by Dale E. Jamison, et al., filed Oct. 11, 2019 as U.S. Appl. No. 16/599,308.
(Continued)

*Primary Examiner* — Chester T Barry
(74) *Attorney, Agent, or Firm* — Conley Rose, P.C.; Rodney B. Carroll (57) ABSTRACT

A method including contacting a contaminated aqueous stream including water and one or more contaminants with a coated porous substrate including a porous substrate coated with a hydrophilic and oleophobic coating to provide a treated water including water that passes through the coated porous substrate, wherein a level of the one or more contaminants in the treated water is less than the level of the one or more contaminants in the contaminated aqueous stream, and wherein the contaminated aqueous stream includes a waste or catchment stream from a hydrocarbon (HC) exploration, production, transportation, or storage facility, a chemical production, transportation, or storage facility, or a combination thereof.

20 Claims, 7 Drawing Sheets

(51) Int. Cl.
| | |
|---|---|
| C02F 1/00 | (2006.01) |
| C02F 1/38 | (2006.01) |
| C02F 1/24 | (2006.01) |
| C02F 103/00 | (2006.01) |
| C02F 1/469 | (2006.01) |
| C02F 1/72 | (2006.01) |
| C02F 3/34 | (2006.01) |
| C02F 101/32 | (2006.01) |
| C02F 103/10 | (2006.01) |
| C02F 103/36 | (2006.01) |
| C02F 1/32 | (2006.01) |

(56) References Cited

U.S. PATENT DOCUMENTS

| | | | |
|---|---|---|---|
| 7,497,954 B2* | 3/2009 | Ivan | B01D 17/047 210/703 |
| 2006/0008865 A1 | 1/2006 | Cote et al. | |
| 2013/0022754 A1* | 1/2013 | Bennett | B41C 1/1041 427/532 |
| 2016/0263494 A1 | 9/2016 | Mueller et al. | |
| 2018/0185791 A1* | 7/2018 | Karnik | B01D 53/22 |
| 2018/0333654 A1 | 11/2018 | Hugonin | |

FOREIGN PATENT DOCUMENTS

| | | |
|---|---|---|
| RU | 2012125859 A | 1/2014 |
| WO | 8500532 A1 | 2/1985 |
| WO | 2018185746 A1 | 10/2018 |

OTHER PUBLICATIONS

Acknowledgement receipt and specification for foreign application entitled "Graphene Oxide Coated Membranes to increase the Density of Water Base Fluids," by Dale E. Jamison, et al., filed Oct. 15, 2019 as International application No. PCT/US2019/056308.

Acknowledgement receipt and specification for foreign application entitled "Coated Porous Substrates for Oil and Gas or Chemical Processing Wastewater Treatment," by Dale E. Jamison, et al., filed Oct. 15, 2019 as International application No. PCT/US2019/056310.

Filing receipt and specification for patent application entitled "Coated Porous Substrates for Fracking Water Treatment," by Dale E. Jamison, et al., filed Oct. 11, 2019 as U.S. Appl. No. 16/599,316.

Acknowledgement receipt and specification for foreign application entitled "Coated Porous Substrates for Fracking Water Treatment," by Dale E. Jamison, et al., filed Oct. 15, 2019 as International application No. PCT/US2019/056311.

* cited by examiner

COATED POROUS SUBSTRATES FOR OIL AND GAS OR CHEMICAL PROCESSING WASTEWATER TREATMENT

TECHNICAL FIELD

The present disclosure relates generally to systems and methods for removing one or more contaminants from a contaminated aqueous stream (for example, without limitation, a waste or catchment aqueous stream from an oil and gas or chemical processing facility) by contacting the contaminated aqueous stream with a coated porous substrate (for example, without limitation, a graphene oxide coated membrane) to provide treated water.

BACKGROUND

During the processing of oil and gas (O&G) and chemical products, various contaminated aqueous fluids including water and one or more contaminants are produced. Managing such contaminated aqueous fluids can be challenging and expensive. For example, during well drilling and production, managing slop water, for example at a rig, can be an important aspect of environmentally responsible waste management. As regulations become more and more restrictive, the level of contaminants (e.g., dissolved hydrocarbons) in a conventionally treated water may be too high to be discharged into the environment and/or efficiently reutilized.

Accordingly, there exists a need for a system and method of removing contaminants from contaminated aqueous fluids encountered during O&G and chemicals processing, whereby a purity of the treated water can be reduced below a level needed for disposal thereof. Desirably, the systems and methods enable recovery of potable water and/or the production of a reduced volume of waste material needing disposal.

BRIEF SUMMARY OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The term "aqueous fluids" is utilized herein to refer to fluids including a base fluid selected from fresh water, seawater, saturated brine, formate brine, or a combination thereof, as well as to hydrocarbon based fluids including some amount of water. In embodiments, an aqueous fluid (e.g., a contaminated aqueous fluid in contaminated aqueous stream line 15 described hereinbelow or a pretreated aqueous fluid in pretreated aqueous stream line 15' described hereinbelow (e.g., with regard to FIG. 2)) includes greater than or equal to about 10, 20, 30, 40, 50, 60, 70, 80, 90, 91, 92, 93, 94, 95, 96, 97, 98, or 99 wt % water. In embodiments, an aqueous fluid (e.g., a contaminated aqueous fluid in contaminated aqueous stream line 15 described hereinbelow or a pretreated aqueous fluid in pretreated aqueous stream line 15' described hereinbelow (e.g., with regard to FIG. 2)) includes primarily (e.g., greater than or equal to about 50, 60, 70, 80, 90, 91, 92, 93, 94, 95, 96, 97, 98, or 99 wt % water).

As utilized herein, the term "hydrophilic" indicates "water attracting", i.e., having more thermodynamically favorable interactions with water than with oil or other hydrophobic solvents.

As utilized herein, the term "oleophobic" indicates "oil repelling", i.e., lacking an affinity to oil.

Herein disclosed are systems and methods for removing one or more contaminants from a contaminated aqueous fluid including water and one or more contaminants. The herein disclosed systems and methods provide for removing the one or more contaminants from the contaminated aqueous fluid by contacting the contaminated aqueous fluid with a coated porous substrate including a porous substrate coated with a hydrophilic and oleophobic coating. Via contact of the contaminated aqueous fluid with the coated porous substrate, water is removed from the contaminated aqueous fluid via passage through the coated porous substrate to provide a treated water including the water that passes through the coated porous substrate. A level of the one or more contaminants in the treated water is less than the level of the one or more contaminants in the contaminated aqueous stream. Accordingly, a "water purity" (e.g., a weight percent of water) of the treated water is greater than a water purity of the contaminated aqueous stream.

As detailed further hereinbelow, according to this disclosure, the contaminated aqueous fluid or stream includes a waste or catchment stream from (i) an O&G or hydrocarbon (HC) exploration, production, transportation, or storage facility, (ii) a chemical production, transportation, or storage facility, or (iii) a combination thereof.

Figure 1A:
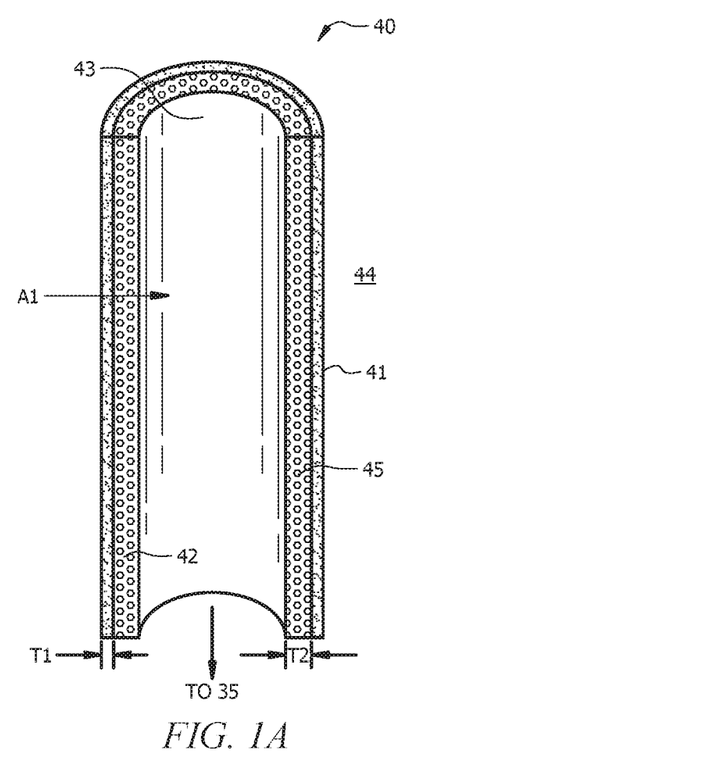
FIG. 1A is a schematic of a coated substrate, according to embodiments of this disclosure.

As detailed hereinbelow, coated substrates (e.g., graphene oxide coated membranes) can be used to remove contaminant(s) from contaminated aqueous streams. As depicted in FIG. 1A, which is a schematic of a coated porous substrate 40, according to embodiments of this disclosure, the coated porous substrate 40 includes a porous substrate 42 including pores 45 and coated by hydrophilic and oleophobic coating 41. The porous substrate 42 can be any suitable substrate which can be coated with the hydrophilic and oleophobic coating 41 and allow passage of water therethrough. In embodiments, the porous substrate 42 includes a support material. Although referred to as a "porous" substrate 42, a substrate of coated substrate 40 can be any permeable material (e.g., with or without "pores" 45) which can be coated with the hydrophilic and oleophobic coating 41 and allow passage of water therethrough. In embodiments, the porous substrate 42 includes a membrane, a particulate, a tube, or a combination thereof. In the embodiment of FIG. 1A, porous substrate 42 includes a cylindrical tube. In embodiments, porous substrate 42 includes a membrane shaped into a cylindrical tube, a flat membrane, or a membrane in another configuration. In embodiments, the porous substrate includes pores 45 having an average diameter of greater than or equal to about 0.5 nm, 1 nm, 2 nm, 3 nm, 4 nm, 5 nm, 10 nm, 20 nm, 30 nm, 40 nm, or 50 nm, less than or equal to about 20, 10, 9, 8, 7, 6, 5, 4, 3, 2, or 1 m, or in a range of from about 0.5 nm to about 20,000 nm, from about 5 nm to about 10,000 nm, or from about 50 nm to about 1,000 nm. In embodiments, the porous substrate includes a polymer, a ceramic, a zeolite, a molecular sieve, or a combination thereof.

As depicted in the embodiment of FIG. 1A, the hydrophilic and oleophobic coating of coated substrate 40 can have a thickness T1 in a range of from about 1 to about 100 nm, from about 1 to about 50 nm, or from about 1 to about 50 nm, from about 1 to about 10 nm, less than or equal to about 100, 50, 40, 30, 20, or 10 nm, and/or greater than or equal to about 1, 2, 3, 4, 5, 6, 7, 8, 9, or 10 nm. Also as depicted in the embodiment of FIG. 1A, the porous substrate 42 of coated substrate 40 can have a thickness T2 in a range of from about 0.2 mm to about 100 mm, from about 1 mm to about 50 mm, or from about 10 mm to about 25 mm, less than or equal to about 100 mm, 50 mm, or 25 mm, and/or greater than or equal to about 0.2 mm, 1 mm, or 10 mm.

Figure 1B:
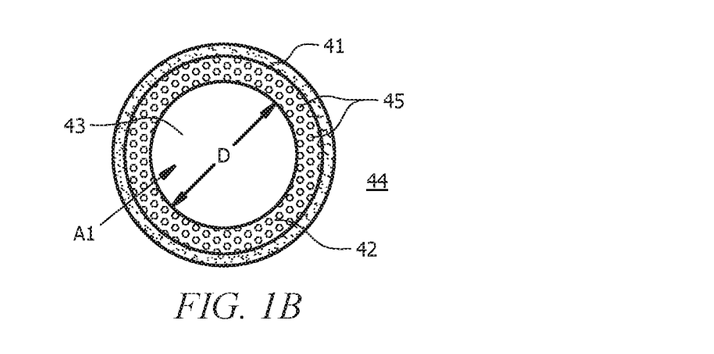
FIG. 1B is a cross section view of the coated substrate of FIG. 1A.

With reference to FIG. 1B, which is a cross section of the coated substrate 40 of FIG. 1A, in embodiments, coated substrate 40 (e.g., a cylindrical or spherical porous substrate 42) has an inner diameter in a range of from about 1 mm to about 50 mm, from about 1 mm to about 25 mm, from about 5 mm to about 35 mm, or from about 10 mm to about 50 mm, less than or equal to about 50 mm, 40 mm, 35 mm, 30 mm, 20 mm, or 10 mm, and/or greater than or equal to about 1 mm, 2 mm, 3 mm, 4 mm, 5 mm, 6 mm, 7 mm, 8 mm, 9 mm, or 10 mm.

Water passes from one side of coated substrate 40 to another, generally from the coated side to the (e.g., porous) substrate side. For example, as depicted in FIG. 1A and FIG. 1B, coated substrate 40 is configured for passage of water from an outside 44 to an inside 43 thereof, as illustrated by arrow A1. Alternatively, a substrate having a cylindrical tube shape is coated on an inside thereof with the hydrophilic and oleophobic coating 41, and water is introduced into the inside 43 of coated substrate 40 and passes from inside 43 to outside 44 (e.g., in a direction opposite that indicated by arrow A1).

As noted hereinabove, the coating 41 of this disclosure is hydrophilic and oleophobic. In embodiments, the hydrophilic and oleophobic coating includes graphene oxide. The natural tendency is for water to migrate through the hydrophilic and oleophobic coated substrate 40 (e.g., a graphene oxide coated membrane) with little or no differential pressure applied to the coated substrate 40 itself. Without limitation, such a graphene coated membrane technology is offered by G2O Water Technologies, Ltd., of Manchester UK. In embodiments, the contacting of the contaminated aqueous fluid with the coated substrate 40 is effected at a differential pressure across the coated substrate 40 of less than or equal to about 10, 9, 8, 7, 6, or 5 psi.

According to this disclosure, the contaminated aqueous fluid which is purified by contact with the coated substrate 40 can include a waste or catchment stream from a HC exploration, production, transportation, or storage facility. Such waste or catchment stream can include water recovered from rainfall, from cleaning, from daily operations, or a combination thereof. In embodiments, the waste or catchment stream includes "slop water". As utilized herein, "slop" or "slop water" includes water collected from the various drains on a well drilling platform or "rig". Slop water can comprise rain water that contacts rig or equipment surfaces, water containing oil or water-based drilling mud from the drains at the drill floor, soap and dope from cleaning of pipe threads at deck, mud and chemical residuals from the mud pump room and mud mix room, water mixed with hydraulic oil from any leakage, or any combination thereof. In embodiments, the well drilling platform is an offshore well drilling platform. For example, in embodiments, the offshore well drilling platform is a floating production storage and offloading (FPSO) unit and the contaminated aqueous fluid includes slop water including deck drainage from one or more FPSO fluid compartments of the FPSO unit. Alternatively, the well drilling platform is an onsite well drilling platform.

In embodiments, the contaminated aqueous fluid or stream includes the waste or catchment stream from the chemical production, transportation, or storage facility. In such embodiments, the waste or catchment stream can include water recovered from rainfall, from cleaning, from daily operations, or a combination thereof.

Figure 2:
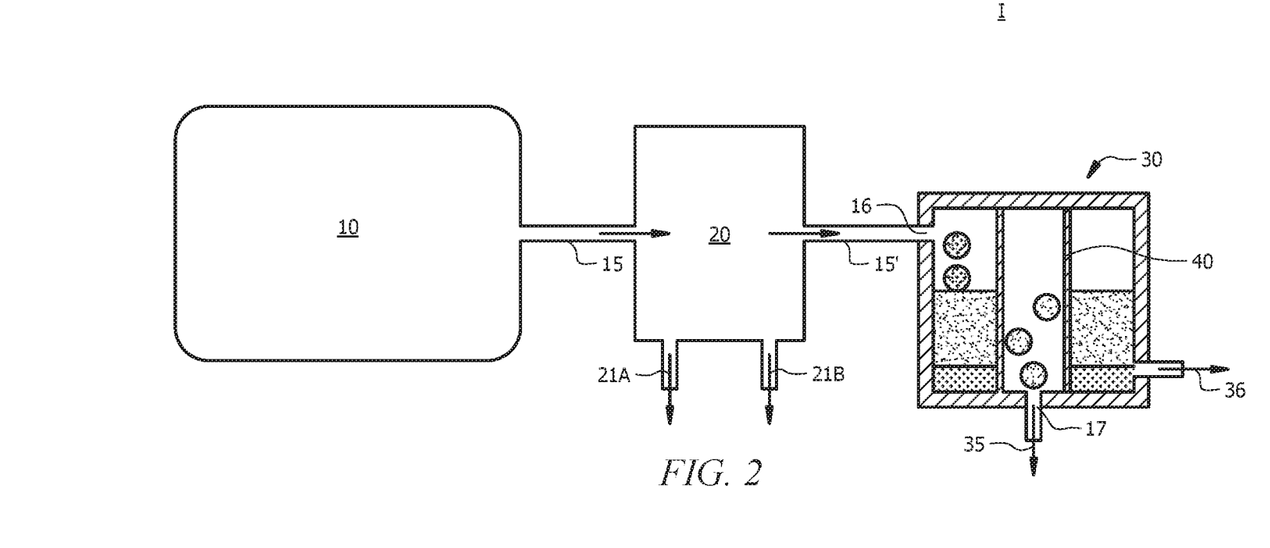
FIG. 2 is a schematic of a system I for removing contaminants from a contaminated aqueous fluid, according to embodiments of this disclosure.

As depicted in FIG. 2, which is a schematic of a system I for removing one or more contaminants from a contaminated aqueous stream (also referred to as a system for purifying water), according to embodiments of this disclosure, a water purification system of this disclosure can include a storage vessel 10 for the contaminated aqueous fluid including water and one or more contaminants, and a water purification unit or apparatus 30 including an inlet 16, an outlet 17, and at least one coated porous substrate 40 including a porous substrate (42, FIG. 1A) coated with the hydrophilic and oleophobic coating (41, FIG. 1A). The system can further include a pretreatment apparatus 20. Storage vessel 10 is fluidly connected with the inlet 16 of the water purification apparatus 30 such that the contaminated aqueous stream can be introduced into the water purification apparatus 30 from the storage vessel 10 via the inlet 16. Within water purification apparatus 30, the contaminated aqueous stream contacts the coated porous substrate(s) 40, and water passes through the coated porous substrate(s) 40 to provide a treated or "purified" water. The treated water that is removed from the water purification apparatus 30 via the outlet 17 has a level of the one or more contaminants that is less than the level of the one or more contaminants in the contaminated aqueous stream introduced into water purification apparatus 30.

In embodiments, a water purification system I does not include a pretreatment apparatus 20. In such embodiments, a contaminated aqueous stream line 15 can fluidly connect storage vessel 10 with water purification apparatus 30, such that contaminated aqueous fluid stored in storage vessel 10 can be introduced directly into water purification apparatus 30.

In embodiments including pretreatment apparatus 20, contaminated aqueous stream line 15 can fluidly connect storage vessel 10 with pretreatment apparatus 20, such that contaminated aqueous fluid stored in storage vessel 10 can be introduced directly into pretreatment apparatus 20. In such embodiments, the contaminated aqueous fluid from storage vessel 10 is pretreated in pretreatment apparatus 20 prior to contacting the contaminated aqueous stream with the coated porous substrate(s) 40 in water purification apparatus 30 to provide the treated water. Pretreating can be utilized to remove from the contaminated aqueous stream and/or reduce the concentration in the contaminated aqueous stream of one or more non-water components. For example, when the contaminated aqueous fluid stored in storage vessel 10 includes substantial amounts of solids, salts, and/or oils, pretreating may be utilized to reduce the levels of solids, salts, and/or oils to a desired level prior to introducing into water purification apparatus 30. The "non-water" components removed via pretreatment in pretreatment apparatus 20 can include the same or different contaminants from those removed via water purification apparatus 30. For example, pretreatment apparatus 20 can remove larger sizes and/or amounts (e.g., volumes) of various contaminants from the contaminated aqueous stream to provide a pretreated contaminated aqueous stream that includes none or a reduced amount of such non-water components relative to an amount thereof in the contaminated aqueous fluid introduced into pretreatment apparatus 20 via contaminated aqueous stream line 15. In embodiments, the one or more non-water components removed via pretreatment apparatus 20 (and/or the one or more contaminants removed via water purification apparatus 30) include one or more oils, one or more solids, one or more salts, one or more gelling or crosslinking agents, one or more polymers, or a combination thereof.

Pretreatment apparatus 20 can be any apparatus operable to remove one or more contaminants from the aqueous fluid stored in storage vessel 10 prior to introduction of the contaminated aqueous fluid into water purification apparatus 30. In some embodiments, water purification apparatus 30 can be considered a final purification stage utilized to provide a "polishing" step. In embodiments, pretreating includes subjecting to: centrifugation, filtering, dissolved air flotation (DAF), exposure to ultraviolet light, electrophoresis, contact with an oxidizer, contact with an enzyme, contact with a gel breaker, contact with an acid, or a combination thereof. In embodiments, pretreatment apparatus 20 removes greater than or equal to about 80, 90, or 95 wt % of solids above 1000, 2000, 3000, 4000, 5000, 6000, 7000, 8000, 9000, 10,000, 15,000, or 20,000 nm. In embodiments, pretreatment apparatus 20 removes oils to a level below about 5000 ppm, 10,000, 15,000, 25000 ppm, 30,000, 40,000 or 50,000 ppm.

One or more non-water component removal lines, such as first non-water component (e.g., solids) removal line 21A and second non-water component (e.g., oils) removal line 21B can be operable for the removal of contaminants from pretreatment apparatus 20. A pretreated contaminated aqueous stream line 15' can fluidly connect pretreatment apparatus 20 with water purification apparatus 30 (e.g., inlet 16 thereof), whereby the contaminated water pretreated in pretreatment apparatus 20 can be introduced into water purification apparatus 30.

In embodiments, the contaminated aqueous fluid introduced into water purification apparatus 30 (e.g., the contaminated aqueous stream in contaminated aqueous stream line 15 or the pretreated contaminated aqueous stream in pretreated contaminated aqueous stream line 15') includes solid(s) contaminant at a level of less than or equal to 15, 10, 9, 8, 7, 6, 5, 4, 3, 2, or 1 weight percent (wt %). In embodiments, the contaminated aqueous fluid introduced into water purification apparatus 30 (e.g., the contaminated aqueous stream in contaminated aqueous stream line 15 or the pretreated contaminated aqueous stream in pretreated contaminated aqueous stream line 15') includes oil contaminant(s) at a level of less than or equal to 5000 ppm, 10,000, 15,000, 20,000, 25000 ppm, 30,000, 40,000, or 50,000 ppm.

As noted hereinabove, water purification apparatus 30 contains therein the coated substrate(s) 40 (e.g., graphene oxide coated membrane(s)). In embodiments, a pump can be utilized to pump the contaminated aqueous fluid (e.g., from storage vessel 10 and/or pretreatment apparatus 20) into water purification apparatus 30. Within water purification apparatus 30, the contaminated aqueous fluid (e.g., the contaminated aqueous fluid in contaminated aqueous stream line 15 and/or pretreated contaminated aqueous stream line 15') is contacted with the coated substrate(s) 40, and water passes through the coated substrate 40 (from a coating 41 side thereof to a substrate 42 side thereof), to provide a treated water. The treated water removed via passage through the coated substrate(s) 40 can be removed from water purification apparatus 30 via one or more purified or 'treated' water outlet line(s) 35, and removed contaminant(s) (e.g., contaminants introduced into water purification apparatus 30 via contaminated aqueous stream line 15 and/or pretreated contaminated aqueous stream line 15' that do not pass through coated substrate(s) 40) can be removed from water purification apparatus 30 via one or more contaminant removal lines 36.

In embodiments, the treated water removed from the contaminated aqueous fluid by the contacting thereof with the coated substrate(s) 40 within water purification apparatus 30 and passage through the porous substrate 42 coated with the hydrophilic and oleophobic coating 41 is potable water. In embodiments, the treated water removed from water purification apparatus 30 via purified water outlet line(s) 35 is potable water. In embodiments, the potable water has a total dissolved solids (TDS) content of less than or equal to about 5000, 4000, 3000, 2000, 1000, 750, or 500 ppm, a hydrocarbon content of less than or equal to about 500, 400, 300, 200, 100, 90, 80, 70, 60, 50, 40, 30, 20, or 10 mg/L, and/or a salt content of less than or equal to about 5000, 4000, 3000, 2000, 1000, 900, 800, 700, 600, 500, 400, 300, 200, or 100 ppm. In embodiments, the TDS is determined by water evaporation using a precision analytical balance. In embodiments, the TDS is estimated via a TDS meter that estimates the TDS from the electrical conductivity. In embodiments, the hydrocarbon content of the treated water removed via purified water outlet line(s) 35 is determined by 40 CFR Part 136 Method 608.3, 624.1, and/or 625.1. In embodiments, the conductivity is determined by measuring the electrical conductivity. In embodiments, the treated water has an oil in water content (also referred to as an amount of total petroleum hydrocarbons (TPH) present) of less than about 5000, 4000, 3000, 2000, 1000, 500, 100, 50, 10, or 1 ppm. In an aspect, the treated water meets zero discharge limits for hydrocarbon (e.g., O&G or TPH) contaminants, for example as defined in regulations (e.g., Norwegian environmental discharge/disposal regulations) governing the operation of offshore O&G operations in the North Sea.

The ability of the herein disclosed system and method to produce potable water from contaminated aqueous fluids can provide advantages over conventional water removal techniques. For example, the conventional method of filtering to remove water generally allows salts, some degree of hydrocarbons, dissolved solids and the like to pass through the filter along with the removed water. Such filtered water is generally not potable, and can be hazardous, thus presenting challenges for disposal thereof. Via the herein disclosed systems and methods, an amount of hazardous waste material (e.g., hazardous water and/or solid or semi-solid waste) can be reduced relative to conventional systems and methods of removing contaminants from contaminated aqueous fluids. Additionally, conventional filtration generally utilizes higher pressures than the herein disclosed systems and methods to separate contaminants from a contaminated aqueous fluid.

As depicted in the embodiment of FIG. 2, the contaminated aqueous fluid introduced into pretreatment apparatus 20 via contaminated aqueous stream line 15 or water purification apparatus 30 via pretreated contaminated aqueous stream line 15' can be introduced from storage vessel 10. Storage vessel 10 can include or be fluidly connected with a storage unit configured for storing the contaminated aqueous fluid. For example, in embodiments, storage vessel 10 is fluidly connected with or includes one or more FPSO fluid compartments of a FPSO unit configured for storing slop water.

Figure 3:
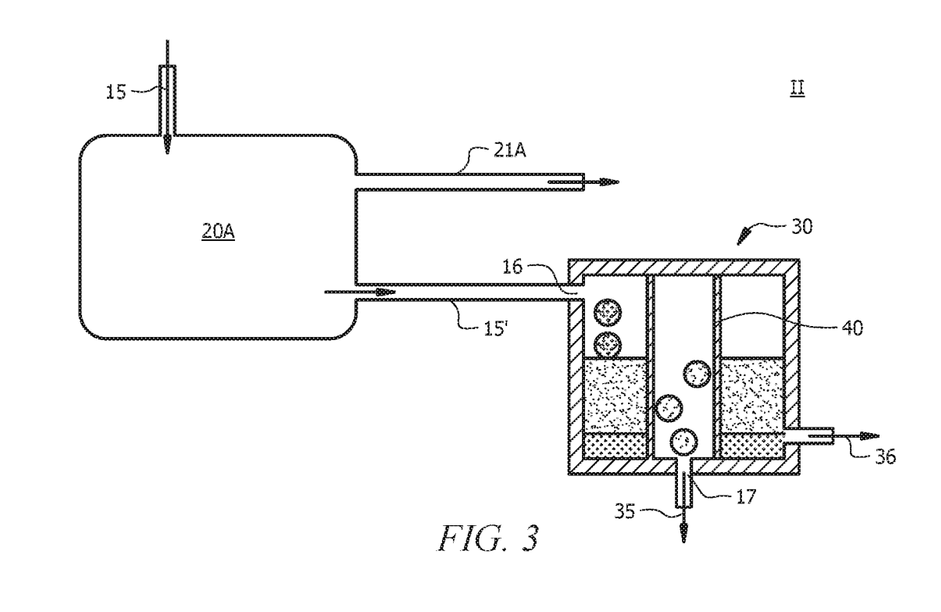
FIG. 3 is a schematic of another system II for removing contaminants from a contaminated aqueous fluid, according to embodiments of this disclosure.

FIG. 3 is a schematic of another system II for purifying a contaminated aqueous fluid, according to embodiments of this disclosure. In the embodiment of FIG. 3, pretreatment apparatus 20A includes a slop unit. Slop unit 20A can be any apparatus conventionally utilized to remove one or more contaminants from slop water introduced thereto via contaminated aqueous stream line 15. For example and without limitation, slop unit 20A can include a BaraH2O™ slop water treatment system, available from Baroid of Houston, Tex. The BaraH2O™ slop treatment unit is modular and highly efficient, and can treat a range of oily water slop produced on a rig at the source. Slop unit 20A is operable to remove one or more contaminants including oils, salts, and/or solids from the contaminated aqueous fluid introduced thereto via contaminated aqueous stream line 15, and provide a pretreated water in pretreated contaminated aqueous stream line 15' having a higher water purity (e.g., a reduced amount of contaminant(s)) than contaminated aqueous fluid introduced thereto via contaminated aqueous stream line 15.

Slop unit 20A can be operable to remove the one or more contaminants (e.g., one or more oils, one or more solids, and/or one or more salts), such that the pretreated aqueous stream withdrawn therefrom via pretreated contaminated aqueous stream line 15' includes a water purity of greater than or equal to about 80, 90, or 95 wt % (e.g., includes less than or equal to about 20, 19, 18, 17, 16, 15, 14, 13, 12, 11, 10, 9, 8, 7, 6, 5, 4, 3, 2, or 1 wt % of each or a total amount of the one or more contaminant(s) or a class thereof (e.g., solids, oils, salts)). One or more removed contaminants lines (with a single contaminant removal line 21A depicted in the embodiment of FIG. 3) can be utilized to remove contaminant(s) (e.g., oils, salts, and/or solids) from slop unit 20A.

In embodiments, slop unit 20A operates to remove the one or more contaminants via a combination of chemical treatment and dissolved air flotation (DAF). In such embodiments, chemicals are added to the contaminated aqueous stream (which, in such embodiments, includes slop water) introduced into slop unit 20 via contaminated aqueous stream line 15 to cause flocculation and binding together of contaminant particles, making them easier to separate via DAF, by allowing flotation by dissolved air to separate both flocculated particles and oil from the slop water, thus providing the treated water removed from slop unit 20A via pretreated contaminated aqueous stream line 15'.

Figure 4:
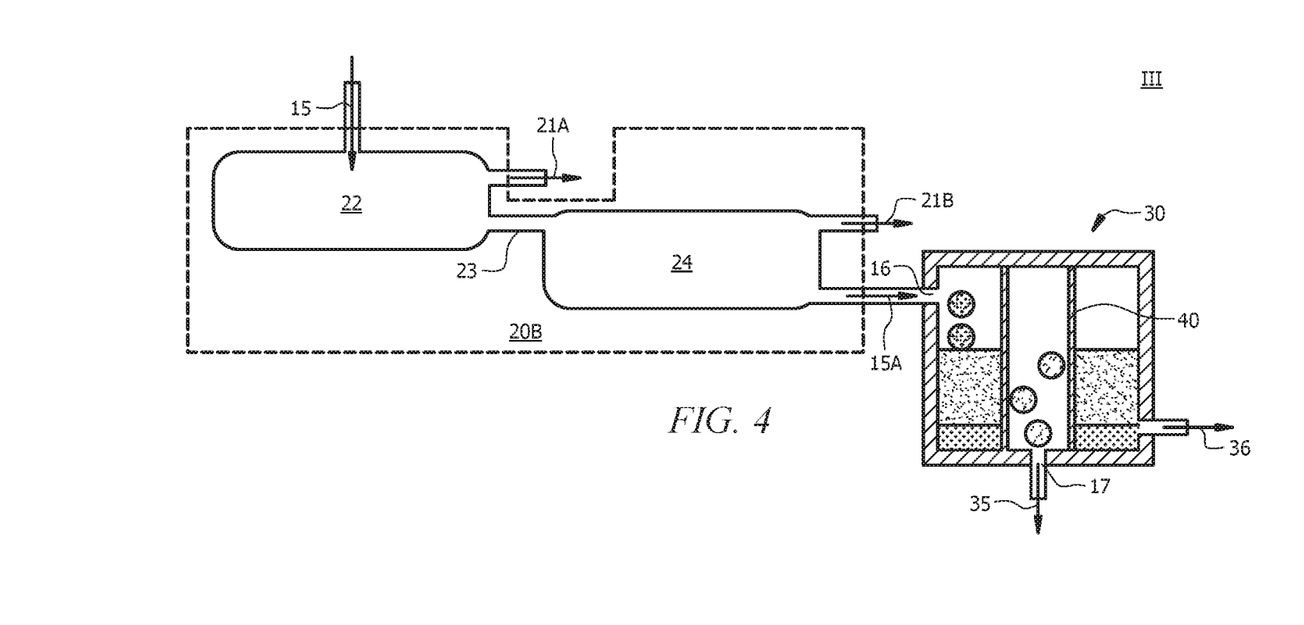
FIG. 4 is a schematic of another system III for removing contaminants from a contaminated aqueous fluid, according to embodiments of this disclosure.

FIG. 4 is a schematic of another system III for purifying a contaminated aqueous fluid, according to embodiments of this disclosure. In the embodiment of FIG. 4, pretreatment apparatus 20B includes a centrifuge 22 and filter 24. Pretreatment apparatus 20B is operable to remove one or more non-water components from contaminated aqueous fluid introduced thereto via contaminated aqueous stream line 15 to provide treated water that can be removed from pretreatment apparatus 20 via pretreated contaminated aqueous stream line 15'. Contaminated aqueous stream line 15 introduces contaminated aqueous fluid (e.g., from a storage vessel, such as storage vessel 10 of FIG. 2) into centrifuge 22. Centrifuge 22 is operable to remove one or more non-water components from the contaminated aqueous fluid introduced thereto. One or more non-water component removal lines 21A are fluidly connected with centrifuge 22 for the removal of the removed one or more non-water components therefrom. For example, one or more first non-water component removal lines 21A can be fluidly connected with centrifuge 22 for the removal therefrom of one or more first non-water components separated therein from the contaminated aqueous stream. A centrifuge outlet line 23 can fluidly connect centrifuge 22 with filter 24, whereby the contaminated aqueous stream from which the one or more first contaminants have been removed in centrifuge 22 can be introduced into filter 24. The contaminated water introduced into filter 24 can include a reduced amount or concentration of oils, salts, and/or solids than the contaminated aqueous fluid introduced into centrifuge 22 via contaminated aqueous stream line 15. One or more second non-water component removal lines 21B can be fluidly connected with filter 24, whereby one or more second non-water components removed from the contaminated water via filter 24 can be removed from filter 24. The pretreated contaminated aqueous fluid introduced into water purification apparatus 30 via pretreated contaminated aqueous stream line 15' can include a reduced amount or concentration of oils, salts, and/or solids than the contaminated aqueous fluid introduced into filter 24 via centrifuge outlet line 23. Pretreated contaminated aqueous stream line 15' can fluidly connect filter 24 with water purification apparatus 30, such that pretreated water (e.g., pretreated contaminated aqueous fluid in pretreated contaminated aqueous stream line 15') produced in pretreatment apparatus 20 can be introduced into water purification apparatus 30.

Although FIGS. 3 and 4 have provided two configurations (20A/20B) of pretreatment apparatus 20 (of FIG. 2), a variety of pretreatment apparatus operable to reduce a level of and/or remove one or more non-water components from a contaminated aqueous fluid introduced thereto via a variety of technologies can be utilized and are within the scope of this disclosure.

Figure 5:
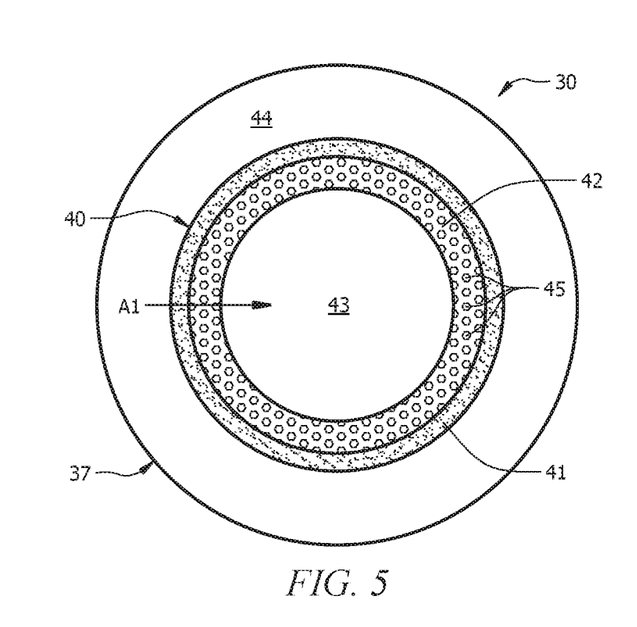
FIG. 5 is a schematic cross section view of a water purification apparatus 30 according to embodiments of this disclosure.

Water purification apparatus 30 can have a variety of configurations, so long as purified/treated water can be removed therefrom via contacting of the contaminated aqueous fluid introduced thereto (e.g., via contaminated aqueous stream line 15 and/or pretreated contaminated aqueous stream line 15') with a coated substrate(s) 40, as described herein. For example, in embodiments, system I of FIG. 2, system II of FIG. 3, or system III of FIG. 4 includes a water purification apparatus 30 as depicted in FIG. 5, which is a schematic of a water purification apparatus 30 according to embodiments of this disclosure. Water purification apparatus 30 of FIG. 5 includes a coated substrate 40 having a cylindrical or tube shaped porous substrate 42 coated with hydrophilic and oleophobic coating 41. In the embodiment of FIG. 5, porous cylindrical substrate 42 is coated on an outside thereof with the coating 41. In this embodiment, coated cylindrical substrate 40 defines an inside 43 or "treated water flow section" 43 inside cylindrical porous substrate 42, and an outside 44 or "contaminated aqueous fluid flow section" 44 between coating 41 and wall (e.g., outer wall) 37. The outer wall 37 and the coated substrate 40 can, in such embodiments, include concentric tubes or cylinders defining outside 44 of coated substrate tube 40 and inside 43 of coated substrate tube 40. In this embodiment, hydrophilic and oleophobic coating 41 of coated substrate tube 40 attracts water from contaminated aqueous fluid introduced into the contaminated aqueous fluid flow section or outside 44 (e.g., via an inlet line connected therewith, which can, in embodiments, be contaminated aqueous stream line 15 or pretreated contaminated stream line 15'), which water passes through cylindrical coated substrate 40 to the inside 43 of cylindrical coated substrate 40 which serves, in this arrangement, as a removed or 'treated' water flow section 43. Accordingly, in the embodiment of FIG. 5, water flows from outside 44 to inside 43 of cylindrical coated substrate 40 in the direction indicated by arrow A1. In such embodiments, an contaminated aqueous fluid inlet line(s) (e.g., contaminated aqueous stream line 15 or pretreated contaminated aqueous stream line 15') can be fluidly connected with and introduce contaminated aqueous fluid into outside 44 of coated substrate 40, while a treated or 'purified' water outlet line(s) 35 can be fluidly connected with and remove water from inside 44 of coated substrate 40.

In alternative embodiments, the hydrophilic and oleophobic coating 41 of a cylindrical coated substrate 40 is coated on the inside surface of porous substrate 42, in which embodiments, inside(s) 43 of cylindrical coated substrate(s) 40 can provide the contaminated aqueous fluid flow section(s) 26, and outside(s) 44 of cylindrical coated substrate(s) 40 can provide the removed or 'treated' water flow section(s) 27. In such embodiments, water from the contaminated aqueous fluid introduced into inside 43 (e.g., via an inlet line connected therewith, which can, in embodiments, be a contaminated aqueous stream line 15 or pretreated contaminated aqueous stream line 15')) can flow from inside 43 to outside 44, in a direction opposite to that indicated by arrow A1 in FIG. 5. In such embodiments, a contaminated aqueous stream line (e.g., contaminated aqueous stream line 15 or pretreated contaminated aqueous stream line 15') can be fluidly connected with and introduce contaminated aqueous fluid into inside(s) 43 of coated substrate(s) 40, while a removed or treated water outlet line(s) 35 can be fluidly connected with and remove treated water from outside(s) 44 of coated substrate(s) 40. In embodiments, a water purification apparatus 30 of this disclosure includes a plurality of cylindrical coated substrates 40, with associated contaminated aqueous stream (inlet) lines (e.g., contaminated aqueous stream lines 15 or pretreated contaminated aqueous stream lines 15'), removed or treated water outlet lines 35, and insides 43 and outsides 44 (which can provide contaminated aqueous fluid flow sections 26 and/or removed/treated water flow sections 27).

In embodiments of a system of this disclosure, water purification apparatus 30 includes a graphene oxide coated substrate (e.g., a coating 41 including graphene oxide on a substrate 42 including a porous membrane), and pretreatment apparatus 20 includes a hydrophobic membrane. Such a system can provide an oil/water/solids separator that utilizes no mechanical action. Without limitation, such a system could be useful, for example, as a passive polishing unit for brine reclamation.

Figure 6A:
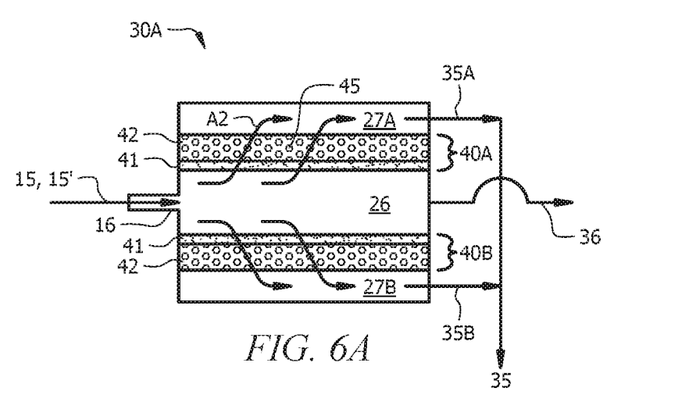
FIG. 6A is a schematic of a water purification apparatus 30A, according to embodiments of this disclosure.
Figure 6B:
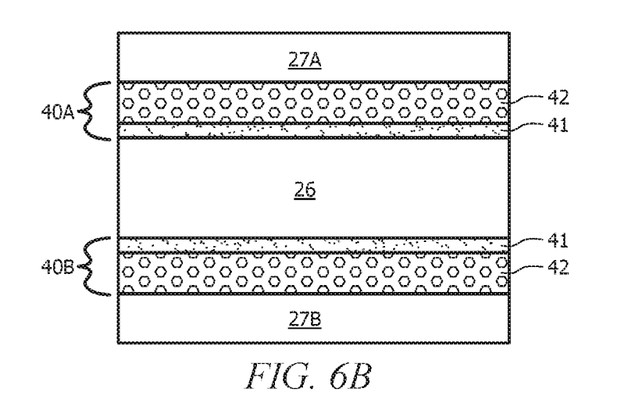
FIG. 6B is a front cross section view of the water purification apparatus 30A of FIG. 6A.

FIG. 6A is a schematic of a water purification apparatus 30A, according to embodiments of this disclosure. Water purification apparatus 30A (shown in side view cross section in FIG. 6A) can have one or more layers or "beds" of coated substrate, with two layers of coated substrate 40, first coated substrate layer 40A and second coated substrate layer 40B, depicted in the embodiment of FIG. 6A. In such embodiments, contaminated aqueous fluid can be introduced (e.g., from storage vessel 10, contaminated aqueous stream line 15 and optionally pretreatment apparatus 20 and pretreated contaminated aqueous stream line 15') into one or more contaminated aqueous fluid flow sections 26 of water purification apparatus 30, and water that passes from the contaminated aqueous fluid, through the coated substrate layers 40A, 40B can be removed via one or more treated water flow sections 27. The contaminated aqueous fluid flow sections 26 provide contact of the contaminated aqueous fluid introduced into water purification apparatus 30 with the coating 41 of first coated substrate layer 40A and second coated substrate layer 40B. The removed water section(s) 27 provide a flow path for water that passes through first coated substrate layer 40A and second coated substrate layer 40B, on a side of substrate 42 opposite the coating 41. A water purification apparatus 30/30A/30B of this disclosure can include any number of contaminated aqueous fluid flow sections 26 and treated water flow sections 27. One contaminated aqueous fluid flow section 26 and two treated water flow sections, including first treated water flow section 27A and second treated water flow section 27B, are depicted in the embodiment of FIG. 6A. FIG. 6B shows a front view cross section of the water purification apparatus 30A of FIG. 6A. A water purification apparatus 30 can include any number of coated substrates 40 (e.g., coated substrate layers, such as first coated substrate layer 40A and second coated substrate layer 40B of the embodiment of FIGS. 6A and 6B), contaminated aqueous fluid flow sections 26, and treated water flow sections 27 (e.g., the single contaminated aqueous fluid flow section 26 and two treated water flow sections including first treated water flow section 27A and second treated water flow section 27B shown in the embodiment of FIG. 6A and FIG. 6B).

Figure 7A:
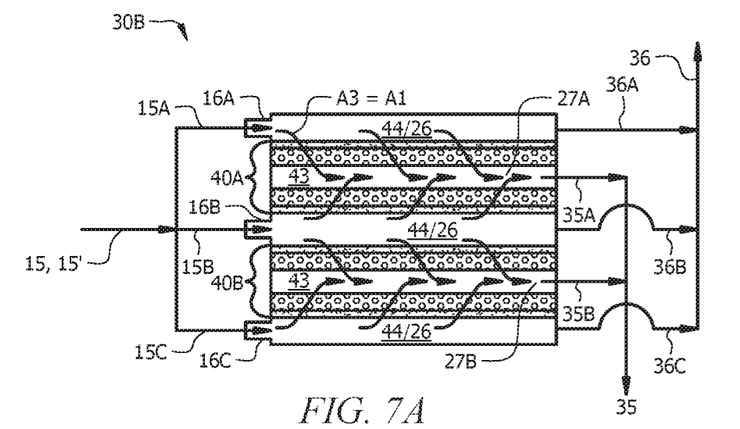
FIG. 7A is a schematic of a water purification apparatus 30B, according to embodiments of this disclosure.
Figure 7B:
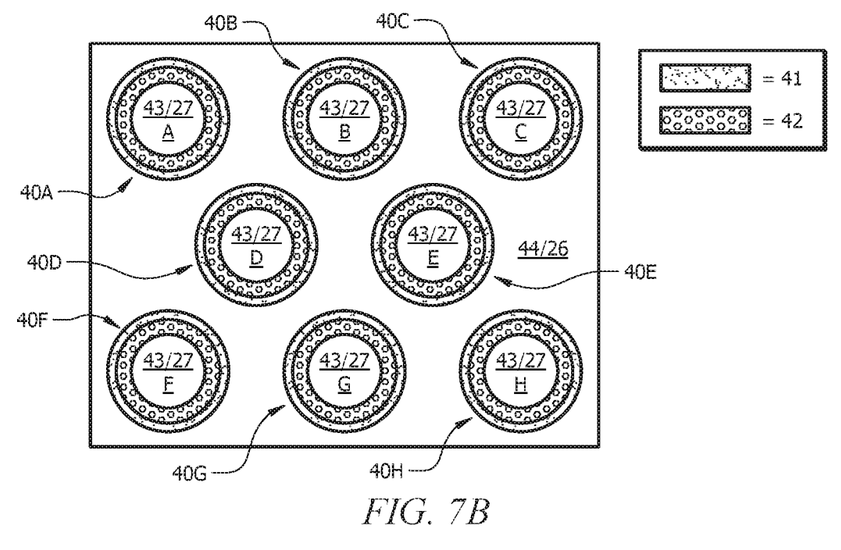
FIG. 7B is a front cross section view of a water purification apparatus 30B of FIG. 7A.

FIG. 7A is a schematic of another water purification apparatus 30B, according to embodiments of this disclosure. FIG. 7B is a front cross section view of a water purification apparatus 30B of the embodiment of FIG. 7A including eight coated substrates 40A-40H with associated insides 43 providing water flow sections 27A-27H and outsides 44 providing water flow section 26. Water purification apparatus 30B (shown in side view cross section in FIG. 7A) can include one or more cylindrical tubes (e.g., cylinders) of coated substrate (e.g., cylindrical coated membranes), with two, first cylindrical coated substrate 40A and second cylindrical coated substrate 40B depicted in the embodiment of FIG. 7A and eight (first through eighth cylindrical coated substrates 40A-40H) depicted in the embodiment of FIG. 7B. In this embodiment, contaminated aqueous fluid can be introduced (e.g., from storage vessel 10, contaminated aqueous stream line 15, pretreatment apparatus 20, and/or or pretreated contaminated aqueous stream line 15') into one or more contaminated aqueous fluid flow sections 26 of water purification apparatus 30 and treated water that passes from the contaminated aqueous fluid, through the coating 41 and substrate 42 of first through eighth cylindrical coated substrates 40A-40H can be removed via one or more treated water flow sections 27. Two treated water flow sections, first treated water flow section 27A and second treated water flow section 27B, are depicted in FIG. 7A and eight treated water flow sections 27A-27H including insides 43A-43H of cylindrical coated substrates 40A-40H depicted in FIG. 7B. In this embodiment, outsides 44 of the coated substrates 40 (e.g., outsides 44 of first cylindrical coated substrate 40A and second cylindrical coated substrate 40B, and so on) provide the contaminated aqueous fluid flow sections 26, while insides 43 of the coated substrates 40 (e.g., insides 43 of first cylindrical coated substrate 40A and second cylindrical coated substrate 40B, and so on) provide the treated water flow sections 27 (e.g., first treated water flow section 27A inside first cylindrical coated substrate 40A, second treated water flow section 27B inside second cylindrical coated substrate 40B, and so on).

A water purification apparatus 30/30A/30B of this disclosure can include any number of coated substrates 40 (e.g., cylindrical coated substrates or coated tubes, such as first cylindrical coated substrate 40A and second cylindrical coated substrate 40B of the embodiment of FIGS. 6A and 6B), contaminated aqueous fluid flow sections 26, and treated water flow sections 27. A contaminated aqueous fluid inlet line, such as contaminated aqueous stream line 15 or pretreated contaminated aqueous stream line 15', can be utilized to introduce the contaminated aqueous fluid (e.g., the contaminated aqueous fluid in contaminated aqueous stream line 15 or pretreated contaminated aqueous stream line 15') into contaminated aqueous fluid flow section(s) 26, a treated water outlet line 35 can be utilized to remove treated water from each of the treated water flow sections 27, and one or more contaminant removal lines 36 can be utilized to remove contaminants (e.g., materials that did not pass through coated substrates 40/40A/40B) from the contaminated aqueous fluid flow section(s) 26 (e.g., at an end thereof). For example, in the embodiment of FIG. 6A and FIG. 6B, contaminated aqueous stream line 15 or pretreated contaminated aqueous stream line 15' can be utilized to introduce contaminated aqueous fluid into contaminated aqueous fluid flow section 26, contaminant removal line 36 can be utilized to remove contaminants from contaminated aqueous fluid flow section 26 (e.g., at an opposite end thereof from the contaminated aqueous fluid inlet 16), and first treated water outlet line 35A and second treated water outlet line 35B can be utilized to remove treated water from first treated water flow section 26A and second treated water flow section 26B, respectively. First treated water outlet line 35A and second treated water outlet line 35B can be manifolded into treated water outlet line 35, in embodiments. In the embodiment of FIG. 7A and FIG. 7B, contaminated aqueous stream line 15 or pretreated contaminated aqueous stream line 15' can be divided into one or more inlet lines, with first contaminated aqueous stream line 15A, second contaminated aqueous stream line 15B, third contaminated aqueous stream line 15C, shown in FIG. 7A, can be utilized to introduce contaminated aqueous fluid (e.g., contaminated aqueous fluid from contaminated aqueous stream line 15 or pretreated contaminated aqueous stream line 15') into contaminated aqueous fluid flow section(s) 26. One or more contaminant removal lines, with first contaminant removal line 36A, second contaminant removal line 36B, and third contaminant removal line 36C shown in FIG. 7A, can be utilized to remove contaminants from contaminated aqueous fluid flow section(s) 26 (e.g., at an opposite end thereof from the contaminated aqueous fluid inlets 16A, 16B, 16C). One or more treated water outlet lines, with first treated water outlet line 35A and second treated water outlet line 35B shown in FIG. 7A, can be utilized to remove treated water from first treated water flow section 27A and second treated water flow section 27B, respectively. One or more contaminant removal lines, with first contaminant removal line 36A, second contaminant removal line 36B, and third contaminant removal line 36C shown in FIG. 7A, can be manifolded into a single contaminant removal line 36, in embodiments. Similarly, first treated water outlet line 35A, second treated water outlet line 35B, and so on, can be manifolded into a single treated water outlet line 35, in embodiments.

One or more contaminated aqueous stream lines 15 can be utilized to introduce contaminated aqueous fluid into each contaminated aqueous fluid flow section 26. One or more contaminant removal lines 36 can be utilized to remove contaminated aqueous fluid from each contaminated aqueous fluid flow section 26. One or more treated water outlet lines 35 can be utilized to removed treated water from each treated water flow section 27.

Although contaminated aqueous fluid flow section 26 of the embodiment of FIG. 7A and FIG. 7B is shown as a continuous section in FIG. 7B (i.e., because coated substrates 40 are depicted as not touching), in embodiments, coated substrate tubes (e.g., first cylindrical coated substrate 40A, second cylindrical coated substrate 40B, etc.) can be in contact with neighboring coated substrate tubes, and a plurality of contaminated aqueous fluid inlet flow lines (e.g., first contaminated aqueous flow line 15A, second contaminated aqueous flow line 15B, and third contaminated aqueous flow line 15C, and so on) can be utilized to introduce the contaminated aqueous fluid (e.g., contaminated aqueous fluid from storage vessel 10 and/or pretreated contaminated aqueous fluid from pretreatment apparatus 20/20A/20B) into disparate contaminated aqueous fluid flow sections 26 of a water purification apparatus 30, in embodiments.

In the embodiment of FIG. 7A and FIG. 7B, water purification apparatus 30 is designed in a similar manner as a heat exchanger, wherein the coated substrate tubes 40 of the water purification apparatus 30 separate the flow of contaminated aqueous fluid and the treated water that passes through the coating 41 (e.g., coated walls) and substrate 42 of the coated substrate tubes 40 (e.g., coated substrates 40A/40B) the way the heat exchange tubes of a heat exchanger separate a heat exchanger fluid from a process fluid and heat passes through the walls of the heat exchanger tubes. The inside 43 and the outside 44 of the tubes act as the contaminated aqueous fluid flow sections 26 and the treated water flow sections 27, respectively, or vice versa.

A plethora of configurations of the coated substrate 40/40A/40B (e.g., layers or sheets, as depicted in the embodiments of FIGS. 6A and 6B, tubes or cylinders, as depicted in the embodiments of FIGS. 7A and 7B) are possible, and within the scope of this disclosure. For example, by way of further non-limiting example, in alternative embodiments, the porous substrate 42 includes hollow particulates, and the particulate substrate is coated with the hydrophilic and oleophobic coating 41 to provide a coated substrate 40 including coated particulates. In such embodiments, water purification apparatus 30 can include a bed, layer, or containment of such coated particulates. In such embodiments, contaminated aqueous fluid introduced into water purification apparatus 30, for example via a contaminated fluid inlet line such as contaminated aqueous stream line 15 or pretreated contaminated aqueous stream line 15' contacts the particulates of coated substrate 40, water passes through the hydrophilic and oleophobic coating 41 of the coated particulates, and enters a hollow core, center, or region of the particulates. In such embodiments, the coated particulates having removed water sequestered therein can be regenerated (i.e., water removed therefrom), and be reused in water purification apparatus 30. Regeneration can include heating, pressing, or the like to remove the water from the spent coated substrate particulates prior to re-use.

In embodiments, a method of this disclosure further includes cycling the coated porous substrate(s) 40/40A/40B/ etc. through a backwash to clean an upstream surface thereof. Such cycling can be effected continuously, in embodiments.

In embodiments, the volume of the contaminated fluid removed from water purification apparatus 30/30A/30B via the contaminant removal line(s) 36/36A/36B/36C/etc. is at least 5, 10, 20, 30, or 40 percent less than a volume of the contaminated aqueous fluid introduced into water purification apparatus 30/30A/30B (e.g., via contaminated aqueous stream line 15 or pretreated contaminated aqueous stream line 15'). As described hereinabove, in embodiments, the treated water produced from the contaminated aqueous fluid via the passage through the coating 41 and porous substrate 42 (of coated substrate(s) 40) is potable water. In embodiments, the volume of the contaminated fluid removed from pretreatment apparatus 20/20A via the one or more non-water component outlet lines 21A/21B and/or removed from water purification apparatus 30/30A/30B via the one or more contaminant removal line(s) 36/36A/36B/36C/etc. is at least 5, 10, 20, 30, or 40 percent less than a volume of the contaminated aqueous fluid introduced into pretreatment apparatus 20/20A and/or water purification apparatus 30/30A/30B, respectively (e.g., via contaminated aqueous stream line 15 or pretreated contaminated aqueous stream line 15').

The method can further include utilizing the treated water that is removed from the contaminated aqueous fluid via the passage through the coated substrate(s) 40/40A/40B (e.g., and removed from water purification apparatus 30 via treated water outlet line(s) 35) onsite, disposing of at least a portion of the treated water onsite or offsite, or a combination thereof. In embodiments, utilizing and/or the disposing are effected without further treatment of the treated water for the removal of one or more (e.g., additional amounts and/or types of) contaminants therefrom. In embodiments, the treated water is utilized onsite or offsite as drinking water, wash water, irrigation water, cooling water, a component of an aqueous containing wellbore servicing fluid (e.g., an aqueous based or oil based wellbore servicing fluid), or a combination thereof. In embodiments, utilizing the at least the portion of the treated water onsite further includes utilizing the at least the portion of the treated water onsite as a component of a wellbore servicing fluid, a component of a chemical process fluid, as drinking water, or a combination thereof. The water treatment/purification to produce the treated water can be effected as detailed hereinabove. For example, in embodiments, the hydrophilic and oleophobic coating utilized in this method includes graphene oxide.

Those of ordinary skill in the art will readily appreciate various benefits that may be realized by the present disclosure. Slop water management on a rig site can be challenging to clean the slop water to the point of legal discharge. In embodiments, the herein disclosed water purification system and method may provide an advantage in slop water treatment. For example, conventional management of offshore drilling slop is costly. Regardless of the composition, slop produced on an offshore facility is typically shipped to shore for treatment and disposal. In addition to the high transportation cost of such slop handling, the process of shipping to shore for treatment exposes operators to the hazards and risks associated with the logistics of transport. According to embodiments of this disclosure, contaminated aqueous fluid, such as slop water, can be effectively treated onsite by the system and method of this disclosure to produce treated water that can be easily disposed of or reutilized onsite, leaving a significantly reduced quantity of material (e.g., the contaminants removed via the one or more non-water component removal lines 21A/21B and/or the one or more contaminant removal lines 36/36A/36B/36C/etc.) that must be disposed of and/or shipped offsite.

The herein disclosed system and method also enable purification of water whereby a volume of the contaminated aqueous fluid can be decreased. In embodiments, via the herein disclosed system and method, potable water can be produced from contaminated aqueous fluids, and the potable water utilized onsite (e.g., for drinking water, wash water, irrigation water, cooling water, a component of an aqueous containing wellbore servicing fluid (e.g., an aqueous based or oil based wellbore servicing fluid), or a combination thereof) and/or sent off site. In embodiments, the removal of contaminants from contaminated aqueous fluids as per this disclosure can result in a reduced amount of hazardous or un-environmentally friendly materials (liquid and/or solid or semi-solid contaminants) for which permits and/or further treatment are required for disposal. In embodiments, a graphene oxide coated membrane is utilized to reduce a hydrocarbon content of the contaminated aqueous fluid to a point that the resulting treated water is potable and/or suitable for discharge with even stringent discharge regulations.

Utilization of a coated substrate(s) (e.g., a coated substrate(s) 40/40A/40B) including a hydrophilic and oleophobic coating 41 (e.g., a graphene oxide coating) may provide an advantage over standard membrane technologies utilized for similar applications due the hydrophilic and oleophobic nature of the herein disclosed coating 41.

Additional Disclosure

The following are non-limiting, specific embodiments in accordance with the present disclosure:

Embodiment A

A method comprising: contacting a contaminated aqueous stream comprising water and one or more contaminants with a coated porous substrate comprising a porous substrate coated with a hydrophilic and oleophobic coating to provide a treated water comprising water that passes through the coated porous substrate, wherein a level of the one or more contaminants in the treated water is less than the level of the one or more contaminants in the contaminated aqueous stream, and wherein the contaminated aqueous stream comprises a waste or catchment stream from a hydrocarbon (HC) exploration, production, transportation, or storage facility, a chemical production, transportation, or storage facility, or a combination thereof.

Embodiment B

The method of Embodiment A, wherein the contaminated aqueous stream comprises the waste or catchment stream from the HC exploration, production, transportation, or storage facility, and wherein the waste or catchment stream includes water recovered from rainfall, from cleaning, from daily operations, or a combination thereof.

Embodiment C

The method of Embodiment A, wherein the contaminated aqueous stream comprises a waste or catchment stream from a HC production or exploration wellsite, and wherein the waste or catchment stream comprises slop water.

Embodiment D

The method of Embodiment C, wherein the slop water includes water collected from one or more drains on a well drilling platform.

Embodiment E

The method of Embodiment D: wherein the well drilling platform is an offshore well drilling platform.

Embodiment F

The method of Embodiment E, wherein the offshore well drilling platform is a floating production storage and offloading (FPSO) unit, and wherein the slop includes deck drainage from one or more FPSO fluid compartments of the FPSO unit.

Embodiment G

The method of any of Embodiment A, wherein the contaminated aqueous stream comprises the waste or catchment stream from the chemical production, transportation, or storage facility, and wherein the waste or catchment stream includes water recovered from rainfall, from cleaning, from daily operations, or a combination thereof.

Embodiment H

The method of any of Embodiment A to Embodiment G, wherein the hydrophilic and oleophobic coating comprises graphene oxide.

Embodiment I

The method of any of Embodiment A to Embodiment H, wherein the porous substrate comprises a membrane, a particulate, a tube, or a combination thereof.

Embodiment J

The method of any of Embodiment A to Embodiment I, wherein the porous substrate comprises a polymer, a ceramic, a zeolite, a molecular sieve, or a combination thereof.

Embodiment K

The method of any of Embodiment A to Embodiment J, wherein the contacting is effected at a differential pressure across the coated porous substrate of less than or equal to about 10, 9, 8, 7, 6, or 5 psi.

Embodiment L

The method of any of Embodiment A to Embodiment K, wherein the treated water is potable water.

Embodiment M

The method of Embodiment L, wherein the potable water comprises a total dissolved solids (TDS) content, as measured by conductivity and/or water evaporation, of less than or equal to about 5000, 4000, 3000, 2000, 1000, 750, or 500 ppm, a hydrocarbon content, as measured by 40 CFR Part 136 Method 608.3, 624.1, and/or 625.1, of less than or equal to about 500, 400, 300, 200, 100, 90, 80, 70, 60, 50, 40, 30, 20, or 10 mg/L, and/or a salt content, as measured by electrical conductivity, of less than or equal to about 5000, 4000, 3000, 2000, 1000, 900, 800, 700, 600, 500, 400, 300, 200, or 100 ppm.

Embodiment N

The method of any of Embodiment A to Embodiment M further comprising cycling the coated porous substrate through a backwash to clean an upstream surface thereof.

Embodiment O

The method of any of Embodiment A to Embodiment N further comprising pretreating the contaminated aqueous stream prior to contacting the contaminated aqueous stream with the coated porous substrate to provide the treated water, wherein pretreating removes from the contaminated aqueous stream and/or reduces the concentration in the contaminated aqueous stream of one or more non-water components of the contaminated aqueous stream.

Embodiment P

The method of any of Embodiment A to Embodiment O, wherein the one or more contaminants comprise one or more oils, one or more salts, one or more solids, or a combination thereof.

Embodiment Q

The method of Embodiment O or Embodiment P, wherein pretreating comprises subjecting to: centrifugation, filtering, dissolved air flotation (DAF), exposure to ultraviolet light, electrophoresis, contact with an oxidizer, contact with an enzyme, contact with a gel breaker, contact with an acid, or a combination thereof.

Embodiment R

The method of any of Embodiment A to Embodiment Q further comprising utilizing at least a portion of the treated water onsite, disposing of at least a portion of the treated water onsite or offsite, or a combination thereof.

Embodiment S

The method of Embodiment R, wherein the utilizing and/or the disposing are effected without further treatment of the treated water for the removal of one or more contaminants therefrom.

Embodiment T

The method of Embodiment R or Embodiment 5, wherein utilizing the at least the portion of the treated water onsite further comprises utilizing the at least the portion of the treated water onsite as a component of a wellbore servicing fluid, a component of a chemical process fluid, as drinking water, or a combination thereof.

Embodiment U

A system comprising: a storage vessel for a contaminated aqueous stream comprising waste or catchment from a hydrocarbon (HC) exploration, production, transportation, or storage facility, a chemical production, transportation, or storage facility, or a combination thereof; and a water purification apparatus comprising an inlet, an outlet, and a coated porous substrate comprising a porous substrate coated with a hydrophilic and oleophobic coating, wherein the storage vessel is fluidly connected with the inlet of the water purification apparatus such that the contaminated aqueous stream can be introduced into the water purification apparatus from the storage vessel via the inlet, whereby the contaminated aqueous stream contacts the coated porous substrate, and water passes through the coated porous substrate to provide a treated water that is removed from the water purification apparatus via the outlet, wherein a level of the one or more contaminants in the treated water is less than the level of the one or more contaminants in the contaminated aqueous stream.

Embodiment V

The system of Embodiment U, wherein the storage vessel contains the waste or catchment from a hydrocarbon (HC) production or exploration wellsite, wherein the waste or catchment comprises slop water, and wherein the slop water includes deck drainage from one or more deck drains on a well drilling platform.

Embodiment W

The system of Embodiment V, wherein the well drilling platform comprises an offshore well drilling platform.

Embodiment X

The system of Embodiment W, wherein the offshore well drilling platform is a floating production storage and offloading (FPSO) unit, and wherein the slop includes deck drainage from one or more FPSO fluid compartments of the FPSO unit.

Embodiment Y

The system of Embodiment U, wherein the storage vessel contains the waste or catchment from the chemical production, transportation, or storage facility.

Embodiment Z1

The system of any of Embodiment U to Embodiment Y, wherein the hydrophilic and oleophobic coating comprises graphene oxide.

Embodiment Z2

The system of any of Embodiment U to Embodiment Z1 further comprising pretreatment apparatus upstream of the water purification apparatus and configured to remove from the contaminated aqueous stream and/or reduce the concentration in the contaminated aqueous stream of one or more non-water components of the contaminated aqueous stream.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

We claim:

1. A method comprising:
   contacting an aqueous waste stream comprising a contaminant with a coated porous substrate, wherein the coated porous substrate is coated with a hydrophilic or oleophobic coating, wherein the hydrophilic or oleophobic coating comprises graphene oxide; and
   passing the aqueous waste stream through the coated porous substrate to provide treated water,
   whereby the concentration of the contaminant in the treated water is less than the concentration of the contaminant in the aqueous waste stream,
   and wherein the aqueous waste stream comprises a waste or catchment stream from (i) a hydrocarbon (HC) exploration, production, transportation, or storage facility, (ii) a chemical production, transportation, or storage facility, or (iii) a combination thereof.

2. The method of claim 1, wherein the aqueous waste stream comprises the waste or catchment stream from the HC exploration, production, transportation, or storage facility, and wherein the waste or catchment stream includes water recovered from rainfall, from cleaning, from daily operations, or a combination thereof.

3. The method of claim 1, wherein the aqueous waste stream comprises a waste or catchment stream from a HC production or exploration wellsite, and wherein the waste or catchment stream comprises slop water.

4. The method of claim 3, wherein the slop water includes water collected from one or more drains on a well drilling platform.

5. The method of claim 4, wherein the well drilling platform is an offshore well drilling platform.

6. The method of claim 5, wherein the offshore well drilling platform is a floating production storage and offloading (FPSO) unit, and wherein the slop includes deck drainage from one or more FPSO fluid compartments of the FPSO unit.

7. The method of claim 1, wherein the aqueous waste stream comprises the waste or catchment stream from the chemical production, transportation, or storage facility, and wherein the waste or catchment stream includes water recovered from rainfall, from cleaning, from daily operations, or a combination thereof.

8. The method of claim 1:
(a) wherein the coated porous substrate comprises a membrane, a particulate, a tube, or a combination thereof;
(b) wherein the coated porous substrate comprises a polymer, a ceramic, a zeolite, a molecular sieve, or a combination thereof;
(c) wherein the contacting is effected at a differential pressure across the coated porous substrate of less than or equal to about 10 psi;
(d) wherein the treated water is potable water, or
(e) any combination of (a), (b), (c), or (d).

9. The method of claim 8 wherein the potable water comprises (i) a total dissolved solids (TDS) content, as measured by conductivity and/or water evaporation, of less than or equal to about 5000 ppm, (ii) a hydrocarbon content, as measured by 40 CFR Part 136 Method 608.3, 624.1, and/or 625.1, of less than or equal to about 500 mg/L, (iii) a salt content, as measured by electrical conductivity, of less than or equal to about 5000 ppm, or (iv) any combination of (i), (ii), or (iii).

10. The method of claim 1 further comprising: removing at least some of a component other than water from the aqueous waste stream during a pretreatment that precedes the contacting.

11. The method of claim 10, wherein pretreatment comprises subjecting the aqueous waste stream to: centrifugation, filtering, dissolved air flotation (DAF), exposure to ultraviolet light, electrophoresis, contact with an oxidizer, contact with an enzyme, contact with a gel breaker, contact with an acid, or a combination thereof.

12. The method of claim 1, wherein the contaminant is selected from the group consisting of an oil, a solid, a salt, and a combination thereof.

13. The method of claim 1 further comprising utilizing at least a portion of the treated water onsite, disposing of at least a portion of the treated water onsite or offsite, or a combination thereof.

14. The method of claim 13,
wherein utilizing at least a portion of the treated water onsite and/or disposing of at least a portion of the treated water onsite or offsite are effected without further treatment of the treated water for the removal of one or more contaminants therefrom; and/or
wherein the utilizing further comprises utilizing the onsite treated water portion as a component of a wellbore servicing fluid, a component of a chemical process fluid, as drinking water, or a combination selected from a component of a wellbore servicing fluid, a component of a chemical process fluid, and as drinking water.

15. A system comprising:
a storage vessel for a aqueous waste stream comprising waste or catchment from a hydrocarbon (HC) exploration, production, transportation, or storage facility, a chemical production, transportation, or storage facility, or a combination thereof; and
a water purification unit comprising an inlet, an outlet, and a coated porous substrate, wherein the coated porous substrate is coated with a hydrophilic or oleophobic coating,
wherein the storage vessel is fluidly connected with the inlet of the water purification unit such that the aqueous waste stream can be introduced into the water purification apparatus from the storage vessel via the inlet, whereby the aqueous waste stream contacts the coated porous substrate, and water passes through the coated porous substrate to provide treated water that is removed from the water purification apparatus via the outlet, wherein the concentration of a contaminants in the treated water is less than the concentration of the contaminants in the aqueous waste stream.

16. The system of claim 15, wherein the storage vessel contains the waste or catchment from a hydrocarbon (HC) production or exploration wellsite, wherein the waste or catchment comprises slop water, and wherein the slop water includes deck drainage from one or more deck drains on a well drilling platform.

17. The system of claim 16, wherein the well drilling platform comprises an offshore well drilling platform, optionally wherein the offshore well drilling platform is a floating production storage and offloading (FPSO) unit and wherein the slop includes deck drainage from one or more FPSO fluid compartments of the FPSO unit.

18. The system of claim 15, wherein the storage vessel contains the waste or catchment from the chemical production, transportation, or storage facility.

19. The system of claim of claim 15, wherein the hydrophilic or oleophobic coating comprises graphene oxide.

20. The system of claim 15:
(a) wherein the coated porous substrate comprises a membrane, a particulate, a tube, or a combination thereof;
(b) wherein the coated porous substrate comprises a polymer, a ceramic, a zeolite, a molecular sieve, or a combination thereof;
(c) wherein the aqueous waste stream contacts the coated porous substrate at a differential pressure across the coated porous substrate of less than or equal to about 10 psi;
(d) wherein the treated water is potable water, or
(e) any combination of (a), (b), (c), or (d).

* * * * *

UNITED STATES PATENT AND TRADEMARK OFFICE
CERTIFICATE OF CORRECTION

| | | |
|---|---|---|
| PATENT NO. | : 10,689,268 B1 | Page 1 of 1 |
| APPLICATION NO. | : 16/599314 | |
| DATED | : June 23, 2020 | |
| INVENTOR(S) | : Dale E. Jamison and William Walter Shumway | |

It is certified that error appears in the above-identified patent and that said Letters Patent is hereby corrected as shown below:

In the Specification

Column 16, Line 66, replace "Embodiment 5," with --Embodiment S,--

Signed and Sealed this
First Day of September, 2020

Andrei Iancu
*Director of the United States Patent and Trademark Office*